Patented July 31, 1934

1,968,704

UNITED STATES PATENT OFFICE 1,968,704

JELLY MANUFACTURE

Robert M. Preston, Chicago, Ill.

No Drawing. Application December 7, 1931,
Serial No. 579,659

6 Claims. (Cl. 99—11)

My invention relates to improvements in jelly-making compositions, and more particularly to compositions adapted for household or domestic use.

One of the objects of the invention is to provide a simple and economical process for the production of jelly or of a jelly-forming composition which contains all the necessary ingredients for forming jelly merely by mixing the composition with fruit juice or water and boiling a very brief time. A further object is to provide a jelly-making composition which is relatively non-hygroscopic and which can be stored without undergoing appreciable deterioration. Other objects and advantages will appear as the specification proceeds.

In employing pectin in jelly making, by methods hitherto proposed, it has been necessary, in order to secure a suitable product, to control the hydrogen-ion concentration of the jelly-forming mixture by incorporating therein a buffer salt, such as sodium acetate or sodium bicarbonate, or other salts of strong bases and weak acids. Such salts control the acidity of the pectin and also serve to neutralize any hydrochloric acid which might be associated with the crude pectin.

The buffer salts indicated above are incorporated with suitable amounts of jelly-forming ingredients such as sugar, pectin, and one or more acids, to form a mixture to which water or fruit juice is subsequently added. Such a mixture, however, is not entirely satisfactory under all conditions which may be encountered, because when a buffer salt such as sodium acetate is utilized, the mixture tends to absorb moisture and to cake on standing and when subsequently mixed with water and boiled to form a jelly, irritating vapors of acetic acid are produced and the jelly formed may have a noticeable acetic odor and flavor.

I have made the discovery that a satisfactory palatable jelly composition may be produced by incorporating a definite amount of compounds which react together to form racemic acid in a jelly-forming composition, the racemic acid formed in the process apparently regulating and buffering the acidity of the mixture during the jellying operation without causing a premature set of the jelly and without impairing the other ingredients of the jelly.

By utilizing, in reacting proportions, a mixture of ammonium tartrate and tartaric acid, in a jelly-making composition, I am able to eliminate sodium acetate and other similar buffer salts from the composition, the racemic acid formed by the action of the ammonium tartrate on the tartaric acid serving apparently to buffer the composition during the jelly-making operation and to produce the desired hydrogen-ion concentration therein.

In the practice of my invention, I prefer to employ a standardized pectin of known strength and acidity and to incorporate therewith a mixture of ammonium tartrate and tartaric acid in reacting proportions to form racemic acid. Preferably I employ about, say, 4 grams of ammonium l-tartrate to 3¼ grams of tartaric acid. Also, I prefer to add suitable carbohydrates in dry form. If desired, a fruit acid, such as citric, malic, and an additional quantity of tartaric acid, together with flavoring and coloring materials, may be added.

The following is given by way of specific example:

|   | Grams |
|---|---|
| Sugar | 454 |
| Racemic acid preparation | 1½ |
| Tartaric acid | ½ |
| 140° citrus pectin | 6.81 |

A cupful of the mixture is added at intervals, say in three equal parts, to a cupful of boiling water and fruit juice. After boiling for approximately 3½ minutes at a temperature of about 216° to 220° F., the mixture is skimmed and poured into a container where it gradually congeals to form a perfect jelly.

Another example is as follows:

|   | Grams |
|---|---|
| Granulated sugar | 700 |
| Racemic acid preparation | ½ |
| Tartaric acid | 1 |
| 140° citrus pectin | 5 |

The above mixture is added to 700 grams of blackberry juice, cooked for about 3 minutes at a temperature of 216° F. to 220° F., skimmed, and after pouring, forms a good jelly in about 5 minutes.

As a third example, a mixture may be formed initially containing the following ingredients:

|   | Parts |
|---|---|
| Cane sugar | 4550 |
| 140° citrus pectin | 32½ |
| Racemic acid preparation | 32½ |
| Tartaric acid | 6½ |

The above constituents are preliminarily mixed and the resulting mixture is then mixed with above 3600 parts of carbohydrate, suitably equal parts of sucrose and anhydrous dextrose, or sucrose alone. The preliminary mixing, while not essential, is advisable as it facilitates the production of a homogeneous mixture. Suitable flavoring and coloring materials may be incorporated in the mixture. If desired, a greater or less proportion of the carbohydrate may be included in the preliminary mixture containing the pectin or sugar may be entirely omitted therefrom.

The expression "racemic acid preparation" appearing in the above examples, indicates a mixture of ammonium tartrate and tartaric acid, in reacting proportions, for the conversion of tartaric acid into racemic form, such proportions being about, say, 4 grams of ammonium tartrate to 3¼ grams of tartaric acid.

The expression "140 grade pectin" indicates a standard dry pectin of which one pound will cause 140 pounds of sugar to gel, the same having an acidity controlled to a pH of 3.4 and 7.0.

The specific compositions previously set forth will produce a jelly of satisfactory consistency, without the addition of other constituents. Thus, the mixture may be added to water in the proportion of 8 oz. of the mixture to 10 oz. of water and boiled to a temperature of 216° to 220° F. or to a proper consistency by a spoon test, and a jelly will be formed. If the composition is intended for use with fruit juices or pulps, suitable reduction in the proportions of acid and of carbohydrate may be made. Furthermore, with different grades of pectin, different proportions of the carbohydrates are required, and in any case, if desired, only part of the carbohydrate required need be mixed in the composition, the remainder being added by the housewife or other user.

While I have described the formation of racemic acid, for the function which it apparently serves, by reacting ammonium tartrate with tartaric acid, the racemic acid may, of course, be formed by any of the methods well known in the art. For the purpose of classification, the materials which may be combined, in the jelly-making operation, to form racemic acid, are designated as RX.

While I have described my compositions as being useful for jelly-making, it should be understood that the compositions are also adapted for use in making pectin confections and other products.

While I have disclosed my invention in considerable detail and have given specific examples, it will be understood that such examples should be construed as illustrative and not by way of limitation. For example, the proportions given above may, of course, be varied in accordance with the particular use desired, as indicated above. Other modifications of my invention will be apparent to those skilled in the art without departing from the spirit and scope thereof. It is, therefore, desired that only such limitations shall be imposed as are indicated in the appended claims.

I claim:

1. A composition adapted to be incorporated in a batch for jelly making and the like, comprising sugar, pectin of standardized pH value, and a mixture of ammonium l-tartrate and tartaric acid in reacting proportions whereby racemic tartaric acid is formed, all of said ingredients being present in proportions such that upon addition of such composition to water or fruit juice, heating to boiling and allowing to set, a jelly will be formed.

2. A composition for jelly making and the like, comprising a dry mixture containing a carbohydrate, a pectin of standardized pH value, and a mixture of ammonium l-tartrate and tartaric acid in proportions adapted to react and form racemic tartaric acid, all of said ingredients being present in proportions such that upon addition of such composition to water or fruit juice, heating to boiling and allowing to set, a jelly will be formed.

3. A composition for jelly making and the like, comprising a dry mixture containing approximately 4550 parts of carbohydrate, approximately 32½ parts of standardized pectin, approximately 32½ parts of racemic acid preparation, and approximately 6½ parts of tartaric acid, said racemic acid preparation consisting of a mixture of ammonium l-tartrate and tartaric acid in such proportion as to form racemic tartaric acid when reacted.

4. In that method of preparing jellies wherein pectin, acid and sugar are added to water or fruit juice, boiled and permitted to set, the step which consists in adding to water or fruit juice a mixture containing pectin, sugar and a mixture of ammonium l-tartrate and tartaric acid in reacting proportions whereby racemic tartaric acid is formed, heating to boiling, and then permitting the jelly to set.

5. The method of producing a jelly, which comprises adding to water or a fruit juice, a mixture of standardized pectin, sugar and ammonium l-tartrate and tartaric acid in reacting proportions whereby racemic tartaric acid is formed, said ingredients being so proportioned as to form a jelly when boiled together and permitted to set, cooking the mixture at a temperature of about 216° to 220° F. to a jellying consistency, and then allowing the mixture to set.

6. A composition adapted to be incorporated in a batch for making pectin jelly confections and the like, comprising pectin of standardized pH value and RX, said RX comprising ammonium l-tartrate and tartaric acid in proportions such as to form racemic tartaric acid when reacted, all of said ingredients being present in proportions such that upon addition of such composition to water or fruit juice and sugar, heating to boiling and allowing to set, a jelly will be formed.

ROBERT M. PRESTON.